Aug. 11, 1970  R. A. SCHAEFFER  3,523,725
XEROGRAPHIC REPRODUCING APPARATUS
Filed May 1, 1968  5 Sheets-Sheet 1

INVENTOR.
ROBERT A. SCHAEFFER
BY
ATTORNEYS

Aug. 11, 1970  R. A. SCHAEFFER  3,523,725
XEROGRAPHIC REPRODUCING APPARATUS
Filed May 1, 1968  5 Sheets-Sheet 5
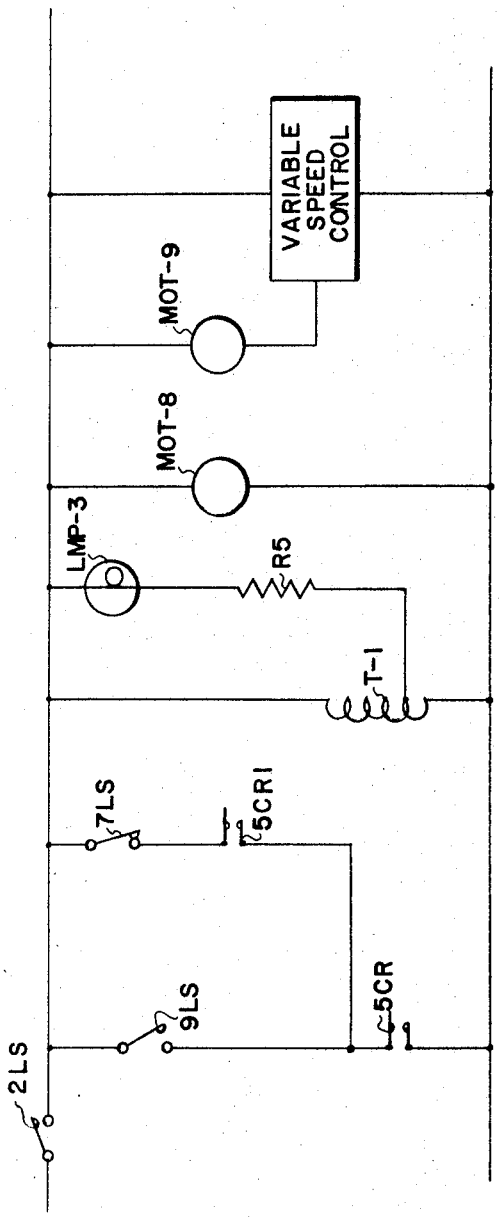
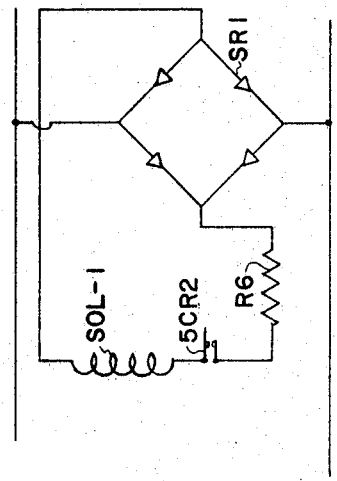
INVENTOR.
ROBERT A. SCHAEFFER
BY
ATTORNEYS United States Patent Office 3,523,725
Patented Aug. 11, 1970

3,523,725
XEROGRAPHIC REPRODUCING APPARATUS
Robert A. Schaeffer, Rochester, N.Y., assignor to Xerox Corporation, Rochester, N.Y., a corporation of New York
Filed May 1, 1968, Ser. No. 725,712
Int. Cl. G03g 15/00
U.S. Cl. 355—8                                   7 Claims

ABSTRACT OF THE DISCLOSURE

Xerographic reproducing apparatus for creating composite copies of material from two distinct imaging stations. The first imaging station is adapted to project light images of opaque documents onto a rotating xerographic drum. The second imaging station is adapted to project information from documents in the form of microfilm. The imaging stations are positioned to selectively discharge the drum surface in a sequential manner. The second imaging station is correlated to begin its scanning of the microfilm at an appropriate time after the start of scan of the first station. When appropriate portions of the first and second documents are blackened a unitary composite latent electrostatic image is created.

---

This invention relates in general to imaging from multiple inputs and in particular to apparatus for causing an an opaque original document and a micro-data image to be imaged into a unitary latent electrostatic image through a xerographic reproducing machine having two distinct and sequentially actuable imaging stations.

Since the disclosure of the basic concept of xerography as disclosed in either Carlson Pat. 2,297,691 issued Oct. 6, 1942, or Carlson Pat. 2,357,809, issued Sept. 12, 1944, a variety of machines and devices have been proposed to incorporate such teachings in a manner to produce copy xerographically on a commercial basis. One commercially successful xerographic machine is that disclosed in U.S. Pat. No. 3,301,126 to Osborne et al. issued on Jan. 31, 1967. This machine has been commercially used for forming reproductions from opaque originals which are placed on a curved glass platen or copyboard. As useful as this machine is, as evidenced by its commercial acceptance, it cannot be used to create full size xerographic copies from microfilm input nor can it be used to create copies from microfilm in conjunction with an opaque original.

Other xerographic machines, as for example, that disclosed in U.S. Pat. No. 3,137,202 to Rutkus et al. issued on June 16, 1964, are designed for making xerographic copies from microfilm or the like. Such machines are incapable of reproducing opaque originals, nor are they capable of creating copies from opaque originals in conjunction with microfilm input.

The value of a machine capable of reproducing from both inputs is thus apparent. When the two imaging stations are properly employed in a single reproducing machine, it attains a utility beyond that of the two types of above referred to machines. It can be used to create copy which is a composite of the materials at the two imaging stations. Such a double imaging machine is useful for such operations as addressing form letters, inserting variable information onto standard forms, filling out standard material onto various purchase order forms and the like.

The present invention is in an improved xerographic reproducing machine having the capacity to copy opaque documents or even three dimensional objects at a first imaging station. A second imaging station is equipped to project imagable material from microfilm input or the like onto the previously imaged area of the xerographic surface. The proper selection of the two optical inputs plus the operative correlation between the two imaging stations produces machine capabilities which are extremely desirous in the field of creating composite images.

It is therefore an object of this invention to improve reproduction apparatus for creating composite copies from multiple inputs.

Another object of this invention is to create composite copies from original materials by information projected from distinct imaging stations.

A further object of this invention is to sequentially image materials from separate imaging stations in timed relationship to thereby form a unitary composite image.

Yet another object of this invention is to form a developable latent electrostatic image from the materials projected from two distinct image stations whereat the material at either imaging station may be varied without disturbing the material at the other station.

These and other objects of the invention are attained by means of xerographic reproducing apparatus having two distinct imaging stations. The first imaging station may contain opaque documents to be scanned and its contents projected onto a rotating xerographic drum. The second imaging station is adapted for supporting documents in the form of microfilm. The second imaging station is correlated to begin its scanning of the microfilm to project images therefrom at an appropriate time after the start of scan at the first station. When appropriate portions of the first and second documents are blackened, a unitary composite latent electrostatic image is created on the xerographic drum.

For a better understanding of the invention as well as other objects and further features thereof, reference is had to the following detailed description of the invention to be read in conjunction with the accompanying drawings, wherein:

FIGS. 5 and 6 are schematic electrical wiring diagrams of the electrical components for the microfilm projector of FIGS. 1–4.

Figure 1:
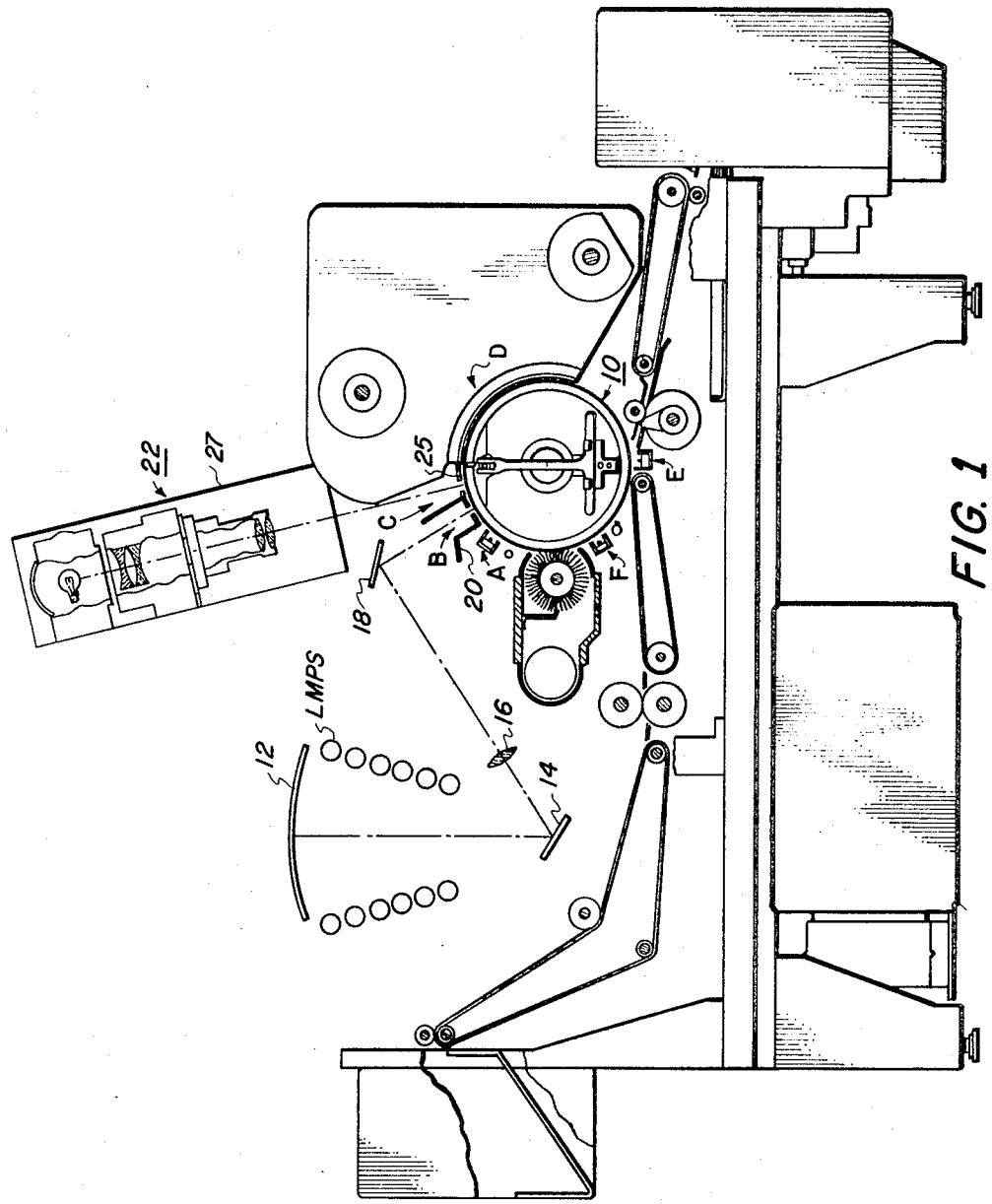
FIG. 1 illustrates schematically a continuous and automatic xerographic reproducing machine equipped with the imaging stations of the instant invention.

As shown schematically in FIG. 1, the automatic xerographic reproducing apparatus comprises a xerographic plate including a photoconductive layer or light-receiving surface on a conductive backing and formed in the shape of a drum 10, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station A, at which a uniform electrostatic charge is deposited on the photoconductive layer of the xerographic drum;

Exposure stations B and C, at which light patterns of material to be reproduced are projected onto the drum surface to dissipate the drum charge in the exposed areas thereof and thereby form a latent electrostatic image of the material patterns to be reproduced;

A developing station D at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station E, at which the xerographic powder is electrostatically transferred from the drum surface to a transfer material or support surface; and A drum cleaning and discharge station F, at which the drum surface is brushed to remove residual toner particles remaining thereon after image transfer, and at which the drum surface is exposed to a relatively bright light source to effect substantially complete discharge of any residual electrostatic charge remaining thereon.

The operation of these stations, except for the two imaging or exposure stations, is fully described in the aforementioned Osborne et al. patent. Reference may be had thereto for their detailed operations.

The first optical scanning or projection assembly B comprises a stationary copyboard which consists of a transparent curved platen member 12, such as, for example, a glass plate or the like, positioned on the exterior of the machine housing, which is adapted to support a document to be reproduced. The document is uniformly illuminated and arranged in light projecting relation to the moving light-receiving surface of the xerographic drum. Uniform lighting is provided by banks of lamps LMPS arranged on opposite sides of the platen. Scanning of the document on the stationary copyboard is accomplished by means of a mirror assembly which is oscillated relative to the platen in timed relation to the movement of the xerographic drum.

The mirror assembly includes an oscillating object mirror 14 mounted below the platen to scan the document in a flowing fashion. The object mirror then reflects an image of the document through a lens 16 onto an image mirror 18 which, in turn, reflects the image onto the xerographic drum 10 through a slot in a fixed light shield 20 positioned adjacent to the xerographic drum surface. In this manner the charge on the drum is selectively dissipated to produce a latent electrostatic image corresponding to the materials on the platen.

Reference may be had to the aforementioned Osborne et al. patent for the detailed operation of these mechanisms and the electrical components correlating their sequence of operation.

Reference is now had to the second exposure or imaging station C. This exposure mechanism of the xerographic machine is adapted to scan material in the form of microfilm to be reproduced and to project an enlarged flowing image of the material onto the rotating xerographic drum in synchronization with its rotation.

In the second projection apparatus 22 of the invention, the scanning of the object is accomplished by means of a movable carriage 24 supporting the microfilm material to be projected. The microfilm is moved in synchronism with the rotation of the xerographic drum to project the image through light shield 25 onto the drum.

Figure 3:
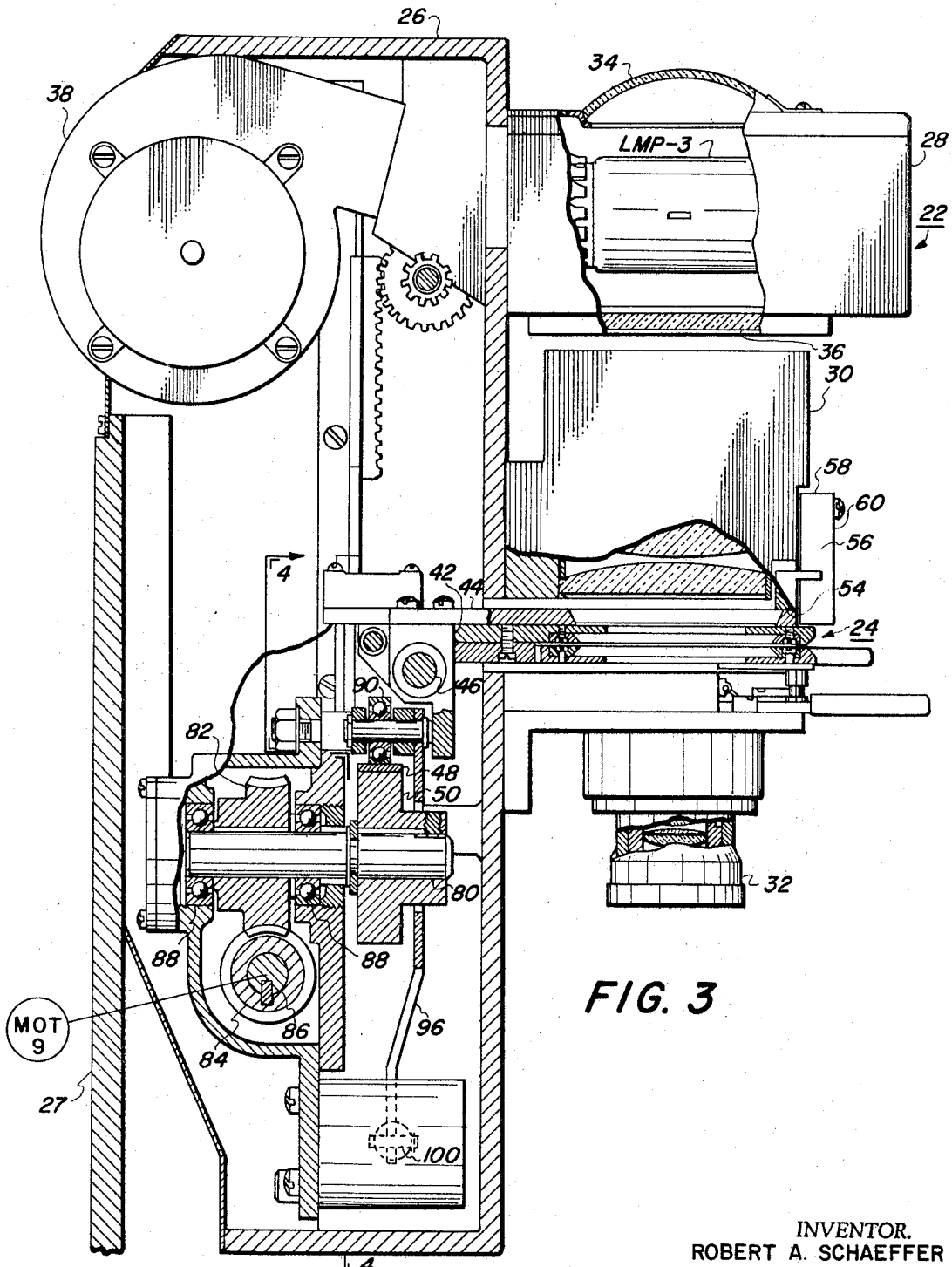
FIG. 3 is a side sectional view of the microfilm projector of the machine with parts broken away for clarity.
Figure 4:
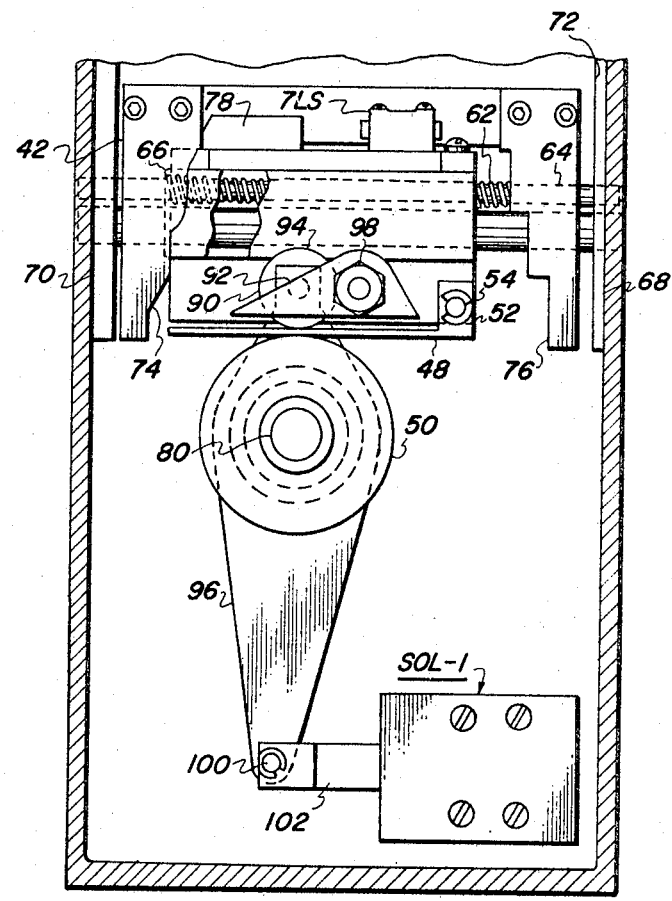
FIG. 4 is a sectional view of the microfilm projector taken along line 4—4 of FIG. 3.

Specifically referring to FIGS. 3 and 4, which illustrate a preferred optical scanning mechanism or projector, the projector 22 includes a main projector casing 26 which can be formed as an integral part of the main frame of the apparatus or formed as a separate element secured to the frame 27 of the apparatus, as shown, for supporting a lamp assembly 28, a condenser lens assembly 30, and a projector lens assembly 32, in alignment with each other as well as aligned with the carriage 24 supporting the copy to be scanned.

In the description of the projector, when reference is made to the front of the projector, it is to be understood that this means the output end or lens end of the projector without reference to its location on the xerographic apparatus.

The lamp assembly includes a projector lamp LMP-3 positioned in a conventional lamp socket and bracket assembly suitably supported and connected to an electrical circuit described in detail hereinafter. Both the projector lamp and the lamp socket and bracket assembly are partially enclosed by a lamp housing. Secured adjacent thereto is a conventional reflector 34 and a heat-absorbing filter 36.

The lamp assembly is secured to the top of the main projector casing 26 with the lamp housing positioned over an opening therein which serves as a conduit connecting the outlet of a motor driven blower 38 unit used to dissipate heat generated by the propection lamp LMP-3. When the projection lamp is energized, light from this lamp passes through the lenses of the condenser lens assembly 30 to illuminate the microfilm copy to be reproduced.

Copy to be scanned, such as, for example, microfilm carried in a suitable copy holder 24 is supported on a carriage 40 for movement in a plane perpendicular to the axis of the condenser lenses whereby copy is scanned to project a flowing image of the object through the projection lens assembly. This is in the direction of the arrow in FIG. 2.

The carriage consists of an apertured carriage plate 42 supporting the copy holder 24. The carriage plate 42 is movably supported by a bearing block 44 slidable on a carriage shaft 46 secured in the side walls of the projector casing, the bearing block being suitably journaled on the shaft by means of suitable bushings.

The carriage is driven in one direction to scan the object to be copied by means of a scan bar 48 adapted to be forced into friction contact with a continuously rotating roller 50. The scan bar is secured to a holder 52, the holder being pivotally secured to the carriage 40 by means of a scan bar stud 54 passing through the bearing block 44 and the holder 52.

The upper end of the carriage plate is guided in a path perpendicular to the axis of the condenser lenses by means of a carriage guide 54 secured to the backside of the carriage plate riding between bearings 56. To support the bearings there is provided a top plate 58 secured to the condenser lens housing, the top plate having a bearing plate 60 secured thereon. The bearings are held in position by suitable retaining screws.

To effect return of the carriage to its original starting position, there is provided a return spring 62 encircling a spring support rod 64 secured in the side walls of the projector casing. The return spring is retained at one end by the wall of the projector casing and at its other end it contacts spring plate 66 secured to the carriage plate 42. Suitable apertures are formed in the spring plate 66 for the passage of spring support rod 64 and carriage shaft 46.

To regulate the length of travel of the carriage with respect to the size drawing to be reproduced from microfilm, there is slidably positioned on slide guides 68 and 70 secured to the side walls of the main projector casing, a cam plate 72 having mounted on its left-hand side (right-hand side as seen in FIG. 4), a carriage return stop cam 74 and a scan limit plate 76, on its right-hand side (left-hand side as seen in FIG. 4). These elements define the start-of-scan position and the end-of-scan position, respectively, of the carriage. The length of travel of the carriage is controlled by varying the start-of-scan and end-of-scan positions by means of the return stop cam 74 and scan limit plate 76. The carriage is moved with respect to these elements by means of a cam follower 78 secured to the carriage plate in position to ride against return stop cam. A more detailed description of these elements can be found in the aforementioned Rutkus et al. patent.

Roller 50 which drives the carriage to permit scanning of the copy by frictional contact with the scan bar 48 on the carriage is secured to shaft 80 which carries worm gear 82 meshing with worm gear 84 carried by drive shaft 86. Shaft 80 is journaled by bearings 88 positioned in fixed relationship with respect to the housing. Drive shaft 86, in like manner, is suitably journaled in the housing by bearings and is driven by motor MOT–9 as described hereinafter at a predetermined speed relative to the xerographic drum.

To force the scan bar 48 of the carriage into frictional contact with the roller 50 to effect a scan movement of the carriage, there is provided a pressure roller 90 here shown as a bearing, mounted on a bearing pin 92 secured in the bifurcated pressure lever 94 and the solenoid operated lever 96 by retaining rings positioned in suitable grooves at opposite ends of the bearing pin.

The lever 96 is pivotally secured at one end to the gear housing by a pivot stud 98 passing through the lever 96 pressure lever 94, and the gear housing, the pivot stud being retained therein by means of a retaining ring (not shown) at one end of the pivot stud and by means of a washer and a nut at the other end.

The lever 96 is connected at its opposite end by a connector pin 100 to the plunger 102 of the solenoid SOL–1 attached to the gear housing, whereby as the solenoid is energized, the lever is pivoted about the axis of the pivot stud thereby rotating the pressure roll aginst the scan bar 48 to force it into frictional driving contact with the roller 50. As shown, the lever 96 has an aperture formed therein to permit it to be moved relative to the roller 50 over which it is positioned.

As the carriage is advanced by the frictional drive between the scan bar 48 and the roller 50, limit switch 7LS attached to the carriage contacts the end-of-scan limit plate 76 whereby the limit switch is actuated to break the circuit to the solenoid SOL–1. As the solenoid is deenergized, the frictional contact force being applied to the scan bar is released to permit the carriage to be returned by spring 62 to the start-of-scan position.

As described, the projector in the embodiment shown, is adapted to scan copy in the form of microfilm frames mounted in apertures of data processing cards. It may also be modified as suggested in the Rutus et al. patent to scan copy in the form of roll microfilm.

A clearer understanding of the operation of the machine and the scanning sequence of the second imaging station can best be obtained by reference to the schematic wiring diagram of FIGS. 5 and 6 in the following description.

When the machine is energized by the mechanisms disclosed in the aforementioned Osborne et al. patent, limit switch 2LS of FIG. 5 is closed to energize the lines to render the scanning mechanism of the second imaging system operable. The closing of 2LS supplies power through the lines to the scan drive motor MOT–9 and its associated variable speed controls. Power is also supplied to MOT–8 to continuously activate the projector fan motor MOT–8. Power is also continuously supplied to the projection lamp LMP–3 which is connected through a limiting resistor R5 to a variable transformer T1 which functions for permitting variations in the intensity of the projection lamp.

The main machine cam bank of the aforementioned Osborne et al. patent is additionally provided with a supplemental limit switch 9LS which functions to initiate the start of scan of the microfilm holding and scanning mechanism. The start-scan limit switch is synchronized to be actuated at a proper time after the start of scan of the scanning mirror of the first imaging system. This start of scan of the microfilm occurs when the leading edge of the area of the xerographic drum to receive the image is directly beneath the aperture in the second light shield 25.

When the cam bank further rotates to trip 9LS to close it, control relay 5CR becomes energized to close its contact 5CR2. The closing of this contact supplies power to SOL–1 to draw in plunger 102 to rotate lever 96 to cause the frictional engagement between the rollers 50 and 90 and scan bar 48 to start the mechanical motion of the microfilm contained in the microfilm support carriage. SOL–1 is held in the operable position through the power applied through a conventional silicone rectifier circuit SR–1 and limiting resistor R6.

As the normally closed end of scan limit switch 7LS on the carriage 24 contacts the end of scan limit plate 76, the switch is depressed to break the circuit to control relay 5CR thereby reopening contact 5CR2 for deenergizing solenoid SOL–1. With the release of the solenoid SOL–1, the carriage of the optical scanning mechanism is free to be returned to its starting position by the biasing action of return spring 62, thereby releasing limit switch 7LS to permit reenergize relay 5CR upon subsequent closure of the start-of-scan limit switch 9LS. Relay contact 5CR1 may be utilized in cooperation with lamp LMP–3 to render that light operative only while the microfilm is being scanned.

Figure 2:
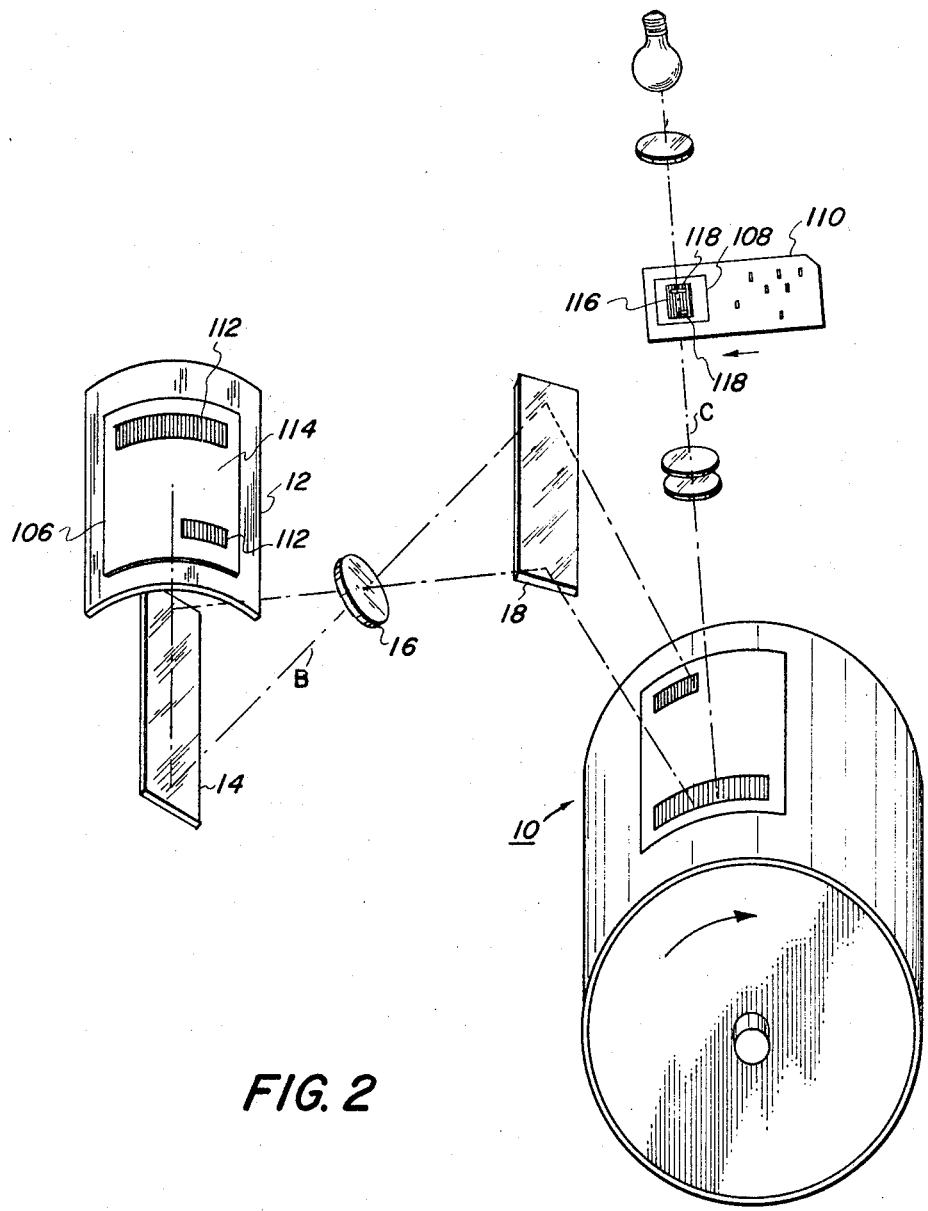
FIG. 2 is a perspective view of the two imaging stations and xerographic drum shown in FIG. 1.

Samples of information bearing members, suitable for use in the machine of the instant invention are shown in FIG. 2. These are shown as an opaque copy sheet 106 resting on platen 12 and microfilm member 108 supported on an aperture card 110 for movement by the projector head. Inasmuch as xerographic techniques are employed in creating the composite copy in accordance with the machine of the instant invention, modifications of the image-bearing materials are necessary. For example, if the opaque sheet 106 were entirely white with dark portions representing only the information bearing areas, the xerographic drum charge would be dissipated in those areas where there was no darkness on the original. The only place where the light rays from the microfilm projector of the second imaging station could dissipate the drum would be in areas corresponding to the darkened or information bearing portions of the first document.

According to the instant invention, the opaque document 106 is typed in the standard manner and then selective portions 112 are darkened. This leaves the remainder of the sheet 114 white with, for example, typed, written or similar information. By way of example, documents 106 could be a form letter with area for the variable address and variable signature darkened. The microfilm would correspond to the opaque document by being dark over its major extent 116 and would be provided with address information and signature information in areas 118. The dark areas 116 of the microfilm thus correspond to the information bearing areas 114 of the document 106 while the information bearing areas 118 of the microfilm correspond to the dark portions 112 of the document.

When the opaque document is scanned, it will project an image onto the drum to dissipate the drum charge in a pattern corresponding to the light areas of the document. Where, for example, an initial positive charge is placed on the drum, the light projected from the document will discharge the drum selectively to create a developable charge pattern thereon corresponding to the information on the document. The drum charge will be substantially retained in portions corresponding to the dark areas 112 of the document. Upon further drum rotation beneath the second imaging station C, the projected microfilm image will selectively dissipate the charge in the areas where the light is projected to the drum. Since the microfilm is dark in areas 116 corresponding to areas whereat the drum has been selectively dissipated, these image bearing areas will retain their developable charge pattern. And the image information bearing areas 118 of the microfilm will selectively dissipate the portions of the drum which were undissipated due to the presence of dark areas 112 on the documents. In this manner, portions of the drum are selectively dissipated into a developable pattern by the information on document 106 while other portions of the drum are selectively dissipated into a developable pattern by the information on microfilm 108. The resulting composite charge pattern is then developed in the conventional xerographic manner, transferred and fused for creating a composite copy of the desired material.

The instant invention has been described with respect to variable information in the form of a form letter with variable address and signature or the like. It should be understood, however, that the invention is readily adapted for use in any type of application wherein it is desired to create copy which is the composite of two sources of informational material. For example, the invention is well suited for projecting variable information on standard forms as purchase orders or the like. Furthermore, the darkness of the opaque document could readily be provided by holding a letter in registration with a black opaque sheet, the black sheet being cut out so that only the portions of the documents to be supplied with the supplemental information are covered by the black of the opaque sheet.

In another application of the instant invention, a document on platen 12 could contain information confidential to some people, but not to others. If the document were to be reproduced, the microfilm could be provided with transparent sections only in areas corresponding to the confidential portion of the document. Thus when the two exposure stations are operated in their normal mode, the light from the second exposure station will dissipate the charge pattern in the confidential areas of the drum to permit the copying of only the non-confidential portions of the document. Inactivating the second exposure station or employing an entirely opaque microfilm would permit the copying of the entire document.

While the present invention as to its objects and advantages, has been described as carried out in a specific embodiment, it is not desired to be limited thereby; but it is intended to cover the invention broadly within the scope of the appended claims.

What is claimed is:

1. Xerographic reproducing apparatus including
   a charging station whereat an endless xerographic member, movable in a continuous manner therepast, is provided with an initial uniform charge and
   an exposure station whereat the initial charge is dissipated in a selective manner to create a developable latent electrostatic image for use in creating copy, the exposure station including
      a first imaging station to sequentially project light rays onto the xerographic member to thereby dissipate the initial charge on the xerographic member in a pattern corresponding to a first information bearing member located at the first imaging station, said first imaging station including a transparent copy holder for an opaque first information bearing member and an oscillatory object mirror to project light rays therefrom to the xerographic member in a flowing manner,
      a second imaging station to sequentially project light rays onto the xerographic member to thereby dissipate the initial charge on the xerographic member in a pattern corresponding to a second information bearing member located at the second imaging station, said second imaging station being positioned to project light rays to the xerographic member at a location removed from the location where the light rays from the first imaging station are projected to the xerographic member and
   means to initiate the beginning of the sequential projection by said second imaging means at a predetermined time after the beginning of sequential projection by said first imaging means.

2. The apparatus as set forth in claim 1 wherein said second imaging station includes a microfilm supporting head adapted to project and enlarge light rays therefrom to the xerographic member in a flowing manner.

3. The apparatus as set forth in claim 2 wherein the means to initiate the beginning of the sequential projection by the second imaging station includes a first limit switch and further including a second limit switch on the second imaging station to terminate the projection by the second imaging station.

4. In reproducing apparatus
   a light sensitive member,
   an exposure station including,
      first imaging means including a lens to sequentially project light rays onto said light sensitive member to create a developable pattern in a configuration corresponding to a first information bearing member located at a first support area remote from said light sensitive member, and
      second imaging means including a lens to sequentially project light rays onto said light sensitive member to create a developable pattern in a configuration corresponding to a second information bearing member located at a second support area remote from said light sensitive member, said last mentioned light rays being focused only on areas of said light sensitive member previously unaffected by the light projected thereto by said first imaging means, and
   means to develop the light responsive member in the areas thereof imaged at said first and second imaging means.

5. The apparatus as set forth in claim 4 and further including means to initiate the beginning of the projection of light rays from the second imaging means at a predetermined time after the beginning of the projection of light rays from the first imaging means.

6. The apparatus as set forth in claim 4 including at least one opaque object projection system and one transparent object projection system.

7. The apparatus as set forth in claim 4 wherein said light sensitive member is positioned substantially in the image plane of said lenses of said first and second imaging means.

References Cited

UNITED STATES PATENTS 2,918,853   12/1959   Oldenbloom _____ 355—8

NORTON ANSHER, Primary Examiner

R. A. WINTERCORN, Assistant Examiner

U.S. Cl. X.R.

355—46